United States Patent [19]

Greenawalt

[11] 4,106,261
[45] Aug. 15, 1978

[54] METHOD OF FORMING, FILLING, AND SEALING SCRIM REINFORCED PLASTIC BAGS

[75] Inventor: Eddie Lee Greenawalt, Lake Jackson, Tex.

[73] Assignee: The Dow Chemical Company, Midland, Mich.

[21] Appl. No.: 822,481

[22] Filed: Aug. 8, 1977

[51] Int. Cl.² .................. B65B 9/12; B65B 41/16
[52] U.S. Cl. .................. 53/27; 53/28; 93/35 R; 156/324
[58] Field of Search .......... 53/27, 28, 180 M, 182 M, 53/170, 172; 93/8 W, 35 R; 156/324, 543

[56] References Cited

U.S. PATENT DOCUMENTS

| | | | |
|---|---|---|---|
| 2,154,521 | 4/1939 | Maxfield | 53/27 |
| 2,374,128 | 4/1945 | Pinckert | 156/324 X |
| 3,061,989 | 11/1962 | Newall et al. | 53/180 M |
| 3,267,822 | 8/1966 | Harrison | 53/180 M |
| 3,616,130 | 10/1971 | Rogosch et al. | 156/324 X |
| 3,661,322 | 5/1972 | Norman | 53/28 X |

Primary Examiner—Robert Louis Spruill
Attorney, Agent, or Firm—Burke M. Halldorson

[57] ABSTRACT

A composite web comprised of free standing (non-blocked) plies is prepared with precisely even linear amounts of each ply, based on the principle of using a carrier ply of preferably heavy gauge plastic film. The carrier ply under controlled tension, is trained about the surface of revolution of a supply roll of a reinforcing scrim material. As the carrier ply is advanced, an exactly matched linear amount of scrim is deposited on one surface of the carrier ply, irrespective of the mismatched elongation properties of the scrim and carrier plies, respectively, and with minimal or no neck-down of the scrim. A liner ply of plastic film can be applied to the opposite side of the scrim using the same principles. The resulting web is ideally suited to be converted into filled, scrim reinforced, plastic bag structures.

5 Claims, 8 Drawing Figures

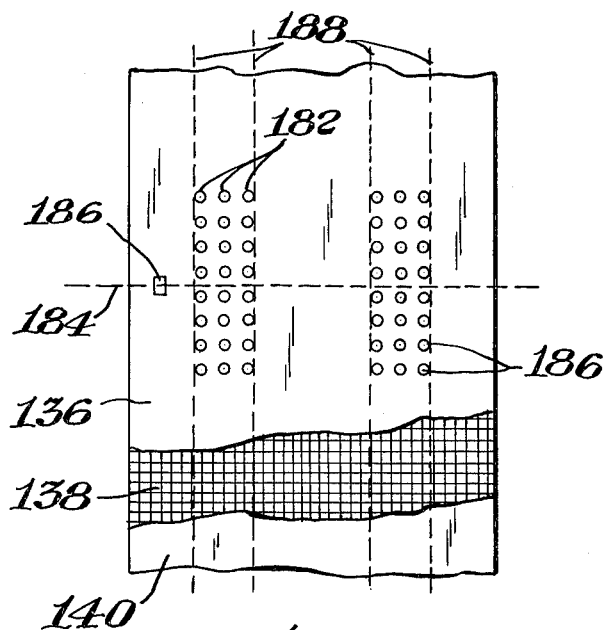
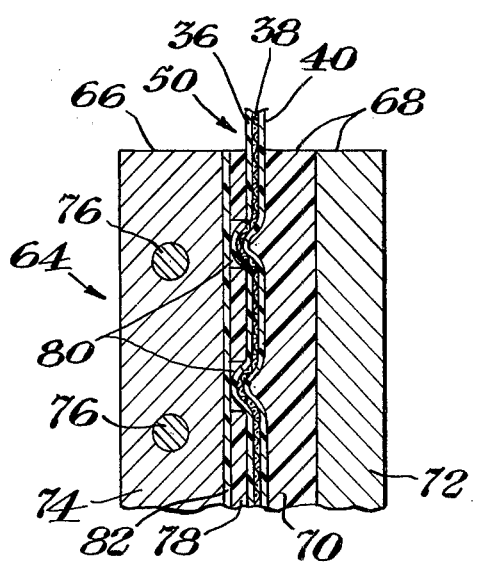
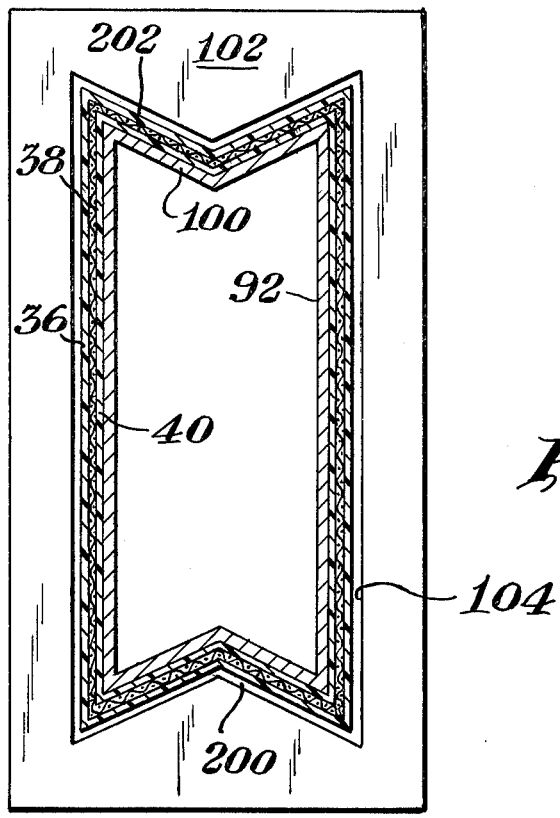

METHOD OF FORMING, FILLING, AND SEALING SCRIM REINFORCED PLASTIC BAGS

FIELD OF THE INVENTION

The invention relates to the preparation of plastic, industrial size bags that are better suited to satisfy current commercial needs of improved palletizing strength, and bag failure resistance. More particularly, the invention relates to the preparation of structured or composite webs, including an encapsulated ply of a scrim reinforcement, and the direct conversion of such webs into filled and sealed plastic, industrial size bags.

BACKGROUND OF THE INVENTION

Generally satisfactory methods and apparatus are available in known art for preparing, merging and controlling multiple layers of plastic films and the like for processing in one plane into permanent or temporary laminations. However, there appears to be no entirely satisfactory method among those known for merging and controlling multi-layered, temporarily bonded webs in processes requiring radically changing planes and shapes of the moving web such as is experienced in tube-forming in a form-fill-seal bagging machine. Better capability to structure multiple-ply webs, including a scrim ply, as an example, would be extremely desirable for the production of improved industrial size plastic bags, i.e., filled, heavy duty commercial bags of about 25 pounds (11.35 kgs) gross weight or greater.

Accordingly it is the objective of this invention to provide an improved method for preparing heavy duty filled plastic bags possessing improved resistance to severe distortion and damage under typical and characteristic warehouse storage, and transport systems applicable to this class of bags.

It is particularly an objective of this invention to provide such method adapted to economically and reliably prepare scrim reinforced heavy duty bags wherein the scrim material may be reliably structured into the bag and strongly secured in the bag seals to produce an end product having maximum and generally heretofore unachieved strength and dimensional stability in both the hoop and axial directions.

It is yet a further objective of this invention to provide an improved method admirably suited to unwind and combine equal linear quantities of distinctly different plies of material including a scrim ply, wherein the process achieves uniformity of stretch between the various plies, and additionally achieves and maintains excellent edge alignment, to thereby produce and prepare a generally wrinkle-free composite web suited for direct conversion into form, fill and seal industrial size bags.

These and other advantages and cognate benefits of the invention are achieved by the method of preparing filled industrial size bags by the steps comprising: converting a scrim reinforced composite web into a tube having overlapped marginal edges, sealing the marginal edges together securing the scrim in the seal, thereafter periodically filling the tube with product and sealing the tube transversely about each successive product fill securing the scrim also in the transverse seals, and combined therewith, the further steps of preparing the composite web in line with the foregoing steps, and comprising unwinding a carrier ply comprising a plastic film from a wound up supply roll and training the carrier ply about the surface of revolution of a wound up roll of a continuous reinforcing scrim ply, drawing the carrier ply forward and causing it to travel about the surface of revolution of the scrim roll substantially without slippage, thereby tying the carrier ply by frictional surface contact to the scrim ply to provide substantially equal lengths of the scrim and the carrier plies in combined form, and applying a second plastic film to the opposite side of the scrim ply, said process being further characterized by the carrier ply comprising a ply of said filled industrial size bags.

Yet additional objects and advantages of the present invention, and its numerous and cognate benefits, are even more apparent and manifest in and by the ensuing description and specification taken in conjunction with the accompanying drawings in which wheresoever possible, like characters of reference designate corresponding material and parts throughout the several views thereof, in which:

FIG. 2 is a plan view of the merged and structured web achieved by the FIG. 1 method and particularly illustrates a preferred pattern for lightly pretacking the plies of the web together preparatory to introducing changes in the web geometry;

FIG. 3 is a cross-sectional view of the presealers of FIG. 1, and shows the preferred method used for presealing the plies of the composite web at spotted locations prior to converting the web into a vertical tube;

FIG. 4 is a cross-sectional view, along reference line 4—4 of FIG. 1, and shows the method for imparting side gussets to the tube;

DETAILED DESCRIPTION OF THE INVENTION

Figure 1:
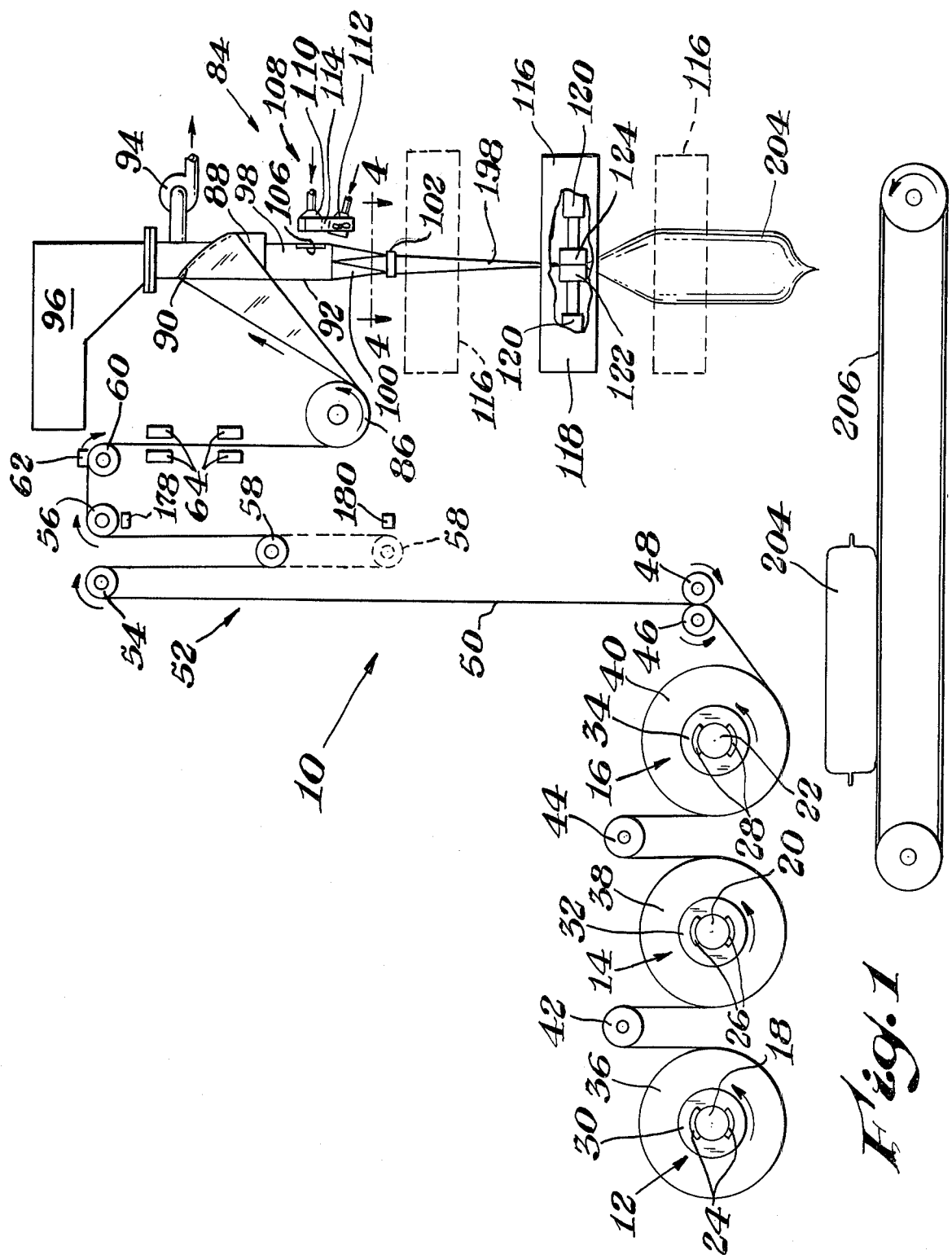
FIG. 1 is an elevational view of apparatus which illustrates the principles of the inventive method for merging and combining multiple layers of material in precisely controlled and equal linear amounts to prepare a composite web including an encapsulated scrim ply, and for converting the web into a tube which is subsequently filled, and transversely sealed.

Referring now to the drawing of FIG. 1, apparatus 10 shown comprises a series of unwind assemblies 12, 14, 16, each embodying a rotatable web support shaft 18, 20, 22, respectively. A break 24, 26, 28, independently controls the unwinding torque of each web support shaft 18, 20, and 22. A pair of flanges or edge guides 30, 32, 34 (only one of each pair shown) are fixed on each support shaft, and are spaced apart by the width of the supply roll to be unwound from each shaft. The flanges are thus aligned in the machine direction and the web support shafts are aligned along precisely parallel axes.

A roll of wound up preferably heavy gauge plastic film, herein the carrier ply 36, is on web support shaft 18. A roll of wound up scrim material herein the scrim ply 38, is on the intermediate web support shaft 20; and a second roll of wound up plastic film, herein the liner ply 40, is on web support shaft 22. The carrier ply with the assistance of idler rolls 42, 44 is sequentially trained about the surface of revolution of the scrim roll and thereafter the liner roll.

A pair of driven nip rollers 46, 48 advance the combined plies, i.e., composite web 50, to an inventory station 52 comprising a pair of spaced idler rolls 54, 56 and an intermediate dancer roll 58. Forward of the inventory station is a braked idler roll 60, and associated brake shoe 62. Ahead of the braked idler roll is a plurality of presealers 64. Preferably a set of four presealers is employed which may be independently adjusted in position.

The presealers each comprise a heated sealing member or block 66 mateable with a back-up sealing member of block 68 (see additionally FIG. 3). Back-up sealing block 68 comprises a resilient, preferably spongy anvil or face layer 70 preferably of a silicon rubber, and which is supported on a flat, rigid base 72.

The heated sealing block 66 preferably comprises a heat conductive base 74 in which there are inset a plurality of electrically heated elements 76. Overlaid on heated base 74 is an insulative mask 78 defining a pattern of discrete, preferably circular apertures 80. A release coating 82 is between mask 78 and a metal base 74 and is constructed preferably of a Teflon ® plastic or a Teflon ® plastic impregnated fiberglass.

A form, fill and seal apparatus 84 ahead of the presealers is preferably designed using principles described in United States Pat. No. 3,925,963, issued on Dec. 16, 1975, to Eddie L. Greenawalt and Lorenzo D. Geren, the full disclosure of which is herein incorporated by reference.

In more brevity than described in the '963 patent, apparatus 84 comprises an adjustable approach roller 86. The approach roller controls the web feed angle to a tube former 88 that includes an air bearing or perforated tube 90 attached to its extreme upper edge. A hollow, vertical filling mandrel 92, having connection with an evacuation fan 94, is within the tube former, and communicates with a product weighing and dumping mechanism 96. The filling mandrel defines an oval or cylindrical intermediate section 98, and a configured lower end portion 100 (shown in FIG. 4). A flat restricting plate 102 includes a central opening 104 that follows the contour of configured end 100, and is disposed thereabout adjacent the extreme lower end of the filling mandrel.

Intermediate section 98 of mandrel 92 supports a vertical back-up sealing strip 106. A vertical, retractable heat sealer 108 is opposite strip 106, and includes a vertical hot gas nozzle 110, and a lower cold gas nozzle 112 attached to the nozzle 110 by a bracket 114.

Figure 5:
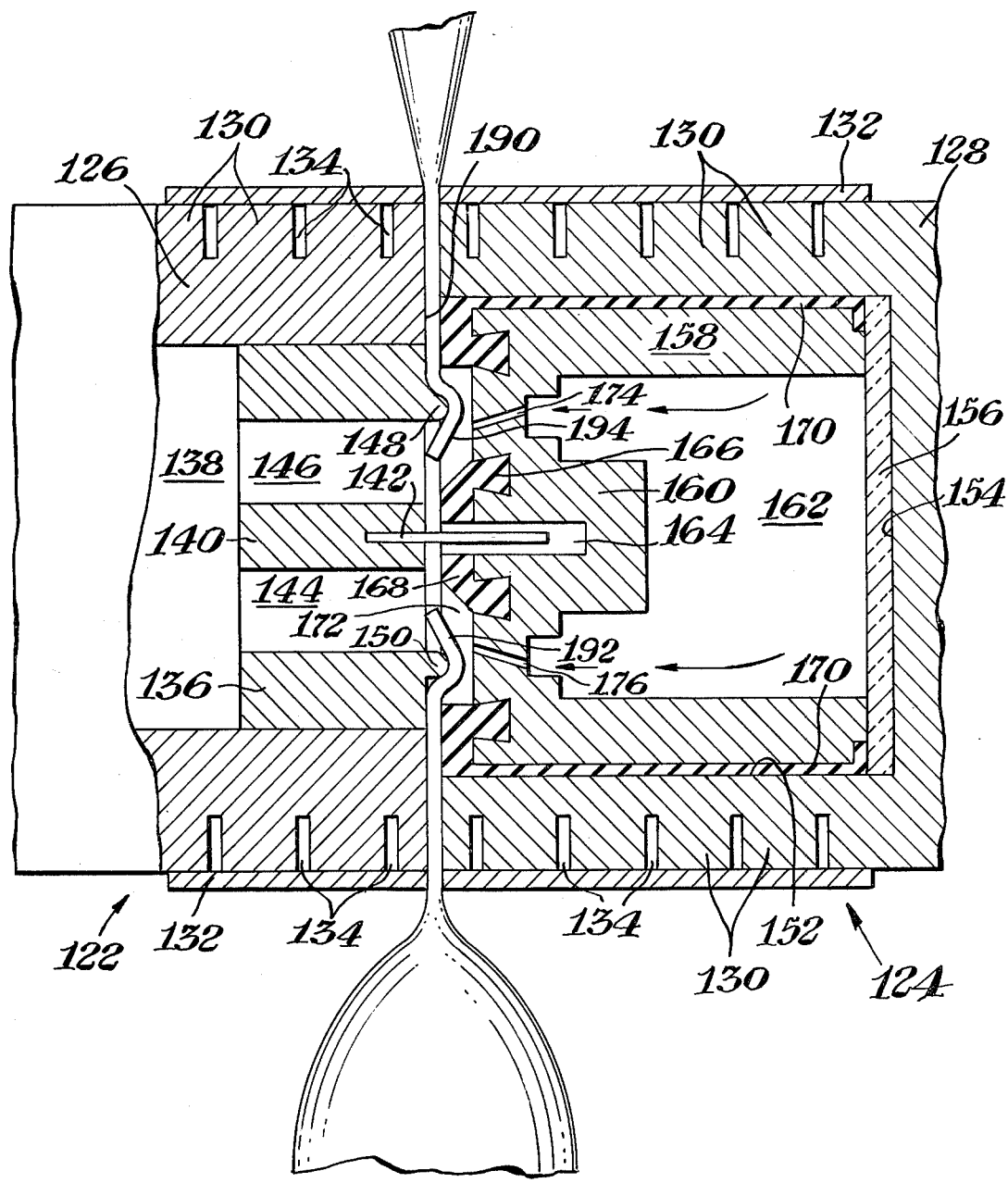
FIG. 5 is a cross-sectional view of the sealing heads of the apparatus of FIG. 1 and shows the method for transversely sealing the tube.

A reciprocally operated sealing carriage 116 is below mandrel 92, and comprises a frame 118, pneumatic or hydraulic cylinders 120 connected to frame 118, and a pair of mateable sealing heads 122, 124 which are connected to the cylinders 120. The sealing heads comprise mold blocks 126, 128, respectively, defining external fins 130 (see also FIG. 5). Cover plates 132 are seated over fins 130 to define internal cooling passages 134.

The sealing head 122, contains a moveable blade holder 136 disposed within an elongated cavity 138 defined by mold block 126. The blade holder includes a central rib 140 which supports a cutting blade 142. A series of aligned exhaust ports 144, 146 are on each side of a rib 140. Traversely extending, welding detents 148, 150 are defined adjacent and along the extreme outward border of exhaust ports 144, 146.

The sealing head 124 defines a cavity 152, the floor 154 of which is lined with an insulative layer 156. A hollow welding head 158 is fixed in cavity 152 and defines a raised welding face 160, and a gas pressurization channel 162. Welding face 160 defines a knife receiving well 164 bordered by strips 166, 168 comprising preferably a room temperature curable silicone rubber. The boundary of welding head 160 is bordered by a like material or resilient gasket 170 which is raised from welding face 160. Gasket 170 seats with mold block 126 when sealing heads 122, 124 are mated to define an internal welding space 172. A pair of diagonal or directional slots 174, 176 defined in welding face 160 communicate between pressurization channel 162 and chamber 172 on each side of knife rib 140.

OPERATION

Carrier ply 36 is trained about the surface of revolution of the scrim roll with the assistance of idler rolls 42, 44. The combined carrier ply/scrim is sequentially trained about the surface of revolution of the liner roll, assisted by idler roll 44 and driven nip rollers 46, 48. A wraparound at start-up of generally between about ⅓ to about ½ the circumference of the respective scrim and liner rolls is preferably achieved.

Variable stresses such as induced at the form, fill and seal station are generally isolated to the area of the driven nip rollers and points forwardly thereof. Thus, brakes 26, 28 are preferably set to substantially minimize free-wheeling upon either slowing or stopping driven nip rollers 46, 48. Since the carrier web is in a "tied" relationship to the scrim and liner rolls by friction engagement, tendencies of a supply roll to travel at a speed variance with respect to the other rolls in line therewith is effectively minimized. Thus, the tied frictional contact between rolls 36, 38, 40 characteristic of the invention, tends to synchronize the rate of unwinding, and produce precise equal linear amounts of each ply despite radical disparity in film and scrim properties such as elongation. The brake 24 is accordingly advantageously set at a minimal level necessary to avoid free wheeling, and to obtain sufficient frictional contact to avoid slippage at either the carrier/scrim interface or scrim/liner interface. Obviously, the precise settings are a matter of fine tuning with the lower drag level range preferred to lessen peak stresses on the web train. The brake 24 controlling the carrier ply is capable theoretically, of course, of controlling the entire web train and thus a single brake or drag control on the carrier web would be feasible provided the frictional hold of the carrier ply on the secondary plies is not exceeded, nor excessive stretch force induced on the carrier ply.

The composite web thus prepared is accumulated in inventory. Limit switches 178, 180 read the vertical position of dancer roll 58. Switch 178 senses a depletion of the inventory, and provides a signal to speed up or start nip rollers 46, 48, whereas switch 180 stops or switches the nip rollers to a slower drive speed to thus maintain the accumulation of the composite web within the permissible limits of the inventory station.

Figure 6:
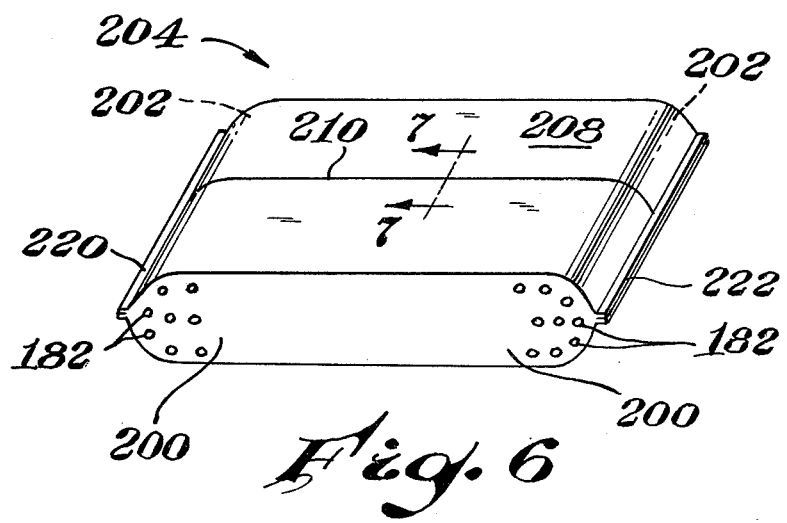
FIG. 6 is an isometric view of a scrim reinforced bag prepared using the method of FIG. 1.

The web is withdrawn from inventory at the independent rate bags are manufactured, and is advanced initially to presealers 64 which are operated in the dwell interval accompanying the intermittent web advancement cycle, and with brake shoe 62 engaged against braked idler roll 60 to stabilize the position of the web. Heated block 66 and back-up block 68 are pressed together with the composite web 50 therebetween. Anvil layer 70 seats discretionally in apertures 80, thereby pressing select portions of composite web 50 against heated base 74. The remaining portions of the web, outside the areas of the apertures, remain nonsealed because of masking element 78. A pattern of discrete heat seals is thereby formed as shown by the spot welds or seals 182 in FIG. 2. The imaginary dotted line 184 extending across the web in the horizontal direction and intersecting with the web registration mark 186, denotes the line on which the web will ultimately be cut in the bag forming process. The imaginary lines 188 aligned in the vertical direction delineate the areas of the web to be tucked inwardly to form the bag side gussets. Accordingly, the four patterns of spot welds 182 shown in FIG. 2 are adapted to reside in the extreme gusset areas of the bag (as shown in FIG. 6) leaving the bag thus essentially constructed of free-standing plies of material. Only light or "tack" welds 182 are necessary, and welds 182 are preferably designed to separate or peal under stress, without damage to the film plies.

Upon intermittent advancement of the presealed composite web, air bearing 90 is activated and vertical sealer 108 is moved forward into sealing position. The advancing web is thus converted from a flat to tubular geometry with overlapped marginal edges, and a continuous longitudinal sealing of the overlapped edges is simultaneously performed by the vertical heat sealer.

The making of each successive filled bag commences with the sealing carriage in the extreme elevated position. Prior to commencing downward travel, cylinders 120 engage sealing heads 122, 124. Gasket 170 thus seats against the mating face 190 of mold block 126 forming an essentially gas tight seal along opposed clamping zones that extend transversely across the width of the tube. Blade holder 136 is near simultaneously advanced seating blade 142 in knifewell 164, and cutting across the transverse width of the tube. Detents 148, 150 draw the cut ends 192, 194 apart thereby defining a space between the cut ends communicating with exhaust ports 144, 146. Heated gas is then introduced under pressure, preferably at both ends of channel 162, and escapes at high velocity through directional slots 174, 176, preferentially striking an extreme portion of the cut ends. The cut ends are thus sealed by the velocity pressure of the heated streams, and the spent gas is immediately vented through exhaust ports 144, 146. The supply of hot gas is subsequently terminated, and a supply of cooling gas is substituted which issues from the directional slots 174, 176 to cool and set the transverse seals within the permissible cycle time.

The tube segment 198 above the mated sealing heads is preferably filled with product as the sealing heads approach the lower extreme position. Evacuation fan 94 reforms a pair of side gussets 200, 202 in the tube after each dump, by evacuating tube segment 198 and thus drawing it against configured end 100 of mandrel 92, assisted by restraining plate 102 (see additionally FIG. 4). Spot welds 182 apply the suction force to the scrim and outer carrier plies of tube segmment 198, thus intimately contouring all plies against configured end 100.

After or upon arrival of the carriage at the lower position, sealing heads 122, 124 are parted releasing the last completed bag 204 onto a takeaway conveyor 206. The succeeding tube segment 198 is supported in draped position from tube former 88. Deactivation of air bearing 90 and engagement of brake shoe 62 provide sufficient force to retard downward slippage of the filled tube segment. The carriage then returns to repeat the cycle, eventually stopping its upward ascent upon reading registration mark 186.

Figure 7:
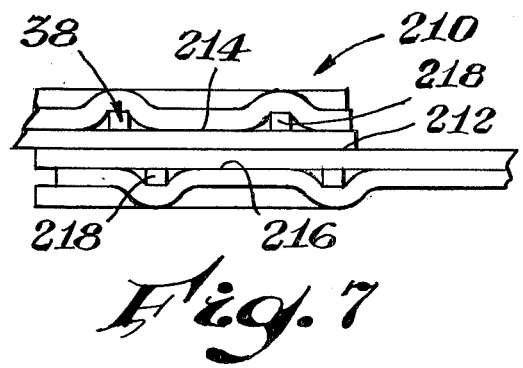
FIG. 7 is an enlarged cross-sectional view of the bag of FIG. 1 taken along reference line 7—7.
Figure 8:
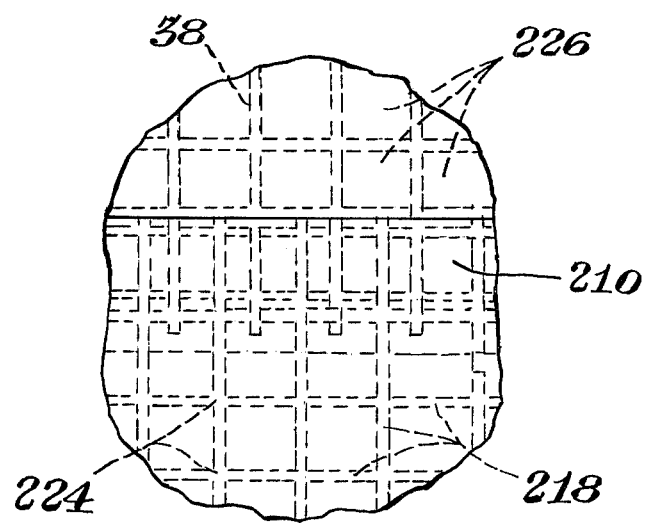
FIG. 8 is a greatly enlarged view of the bag of FIG. 6 taken in the area of the longitudinal seal of the bag.

Bags 204 formed according to the invention are shown in FIGS. 6 through 8. The bag comprises a tubular body 208 comprising an exterior ply of plastic film (i.e., carrier ply 36), an interior ply or liner also of plastic film, (i.e. line ply 40), and an inner encapsulated ply of scrim material (i.e., scrim ply 38). The longitudinal seam or seal 210 formed by vertical sealer 108 is between lapped plies is of a structure as represented in FIGS. 7 and 8. The two plastic plies 36, 40 of the structured web are joined along the central interface 212 and additionally, along interfaces 214, 216. The strands 218 of scrim 38 are mechanically fastened in the seal by intimate conformity and deformation of the plastic about the strands of the scrim. A similar structure applies in the end welds 220, 222 wherein all layers of plastic are intimately sealed together and the strands are held mechanically in the seal.

Scrim material, as the term is used herein means an interconnected network of strands, filaments, woven or non-woven fibers, or the like, suitable for use as a beneficial reinforcing ply in industrial bag structures. Characteristically, such interconnected networks of strands, filaments etc. define a repeating pattern of open spaces 226 (see FIGS. 2 and 8).

The preferred scrim is a biaxially stretched and thus oriented, pre-slit polypropylene sheet, shown by dotted lines in the FIG. 8 drawing. Since the material is formed from a planar sheet or film, there is thus preferably not a double thickness at the intersecting points 224 of strands 218. It has been found that the strands need not be heat sealable, since mechanical fastening of the strands in the longitudinal and transverse seals is adequate using the described sealing technique, although heat sealable scrims may be used.

The carrier ply and liner ply comprise heat sealable, flexible plastic films, characteristically under generally about 10 mils thickness. Typically films of about 2-5 mils each would be suitable for 50 lb. size bags. Polyethylene is the preferred film, though other heat sealable plastic films are known and may be used.

While the invention has been described to set forth the preferred mode, modifications can be made while remaining within the principles of the disclosure and improvements herein described. For example, the use of adhesives, or even electrostatic charges may be selected as alternate known means for pretacking the plies of the composite web together. Alternate known means for advancing the composite web, other than the preferred driven nip rollers, are further contemplated within the broad scope of the disclosure, including advancement of the web by the sealing carriage solely. Accordingly it is intended only to limit the scope of the invention to that extent set out and distinguished in the appended claims.

What is claimed is:

1. The method of preparing filled industrial size bags by the steps comprising: converting a scrim reinforced composite web into a tube having overlapped marginal edges, sealing the marginal edges together securing the scrim in the seal, thereafter periodically filling the tube with product and sealing the tube transversely about each successive product fill, securing the scrim also in the transverse seals, combined therewith, the further steps of preparing the composite web in line with the foregoing steps, and comprising the steps of unwinding a carrier ply comprising a plastic film from a wound up supply roll and training the carrier ply about the surface of revolution of a wound up roll of a continuous reinforcing scrim ply, drawing the carrier ply forward and causing it to travel about the surface of revolution of the scrim roll substantially without slippage, thereby tying the carrier ply by frictional surface contact to the scrim ply to provide substantially equal lengths of the scrim ply and the carrier plies in combined form, and applying a second plastic film to the opposite side of the scrim ply, said process being further characterized by the carrier ply comprising a ply of said filled industrial size bags.

2. The method of claim 1 including joining the carrier ply to the second plastic film ply at spotted locations prior to the step of converting the composite web into a tube.

3. The method of claim 1 wherein the amount of wrap of the carrier ply about the scrim supply roll at initial start-up is generally between about ⅓ to about ½ of the circumference of said scrim supply roll.

4. The method of claim 1 wherein the combined carrier ply/scrim ply is trained about the surface of revolution of a wound-up supply roll comprising said second plastic film ply, with the scrim ply contacting the surface of said second plastic film ply, said carrier ply/scrim ply being drawn forward and caused to travel about the surface of revolution of the supply roll of said second film ply, substantially without slippage at the contacting interface thereby tying the carrier ply by frictional contact to said scrim roll and the supply roll of said second plastic film, to thereby provide substantially equal lengths of said carrier ply, scrim ply, and the second plastic film ply in combined form.

5. The method of claim 4 wherein the amount of wrap of said carrier ply about said scrim roll and second plastic film supply roll at initial start-up is generally between about ⅓ to about ½ the circumference of said rolls, respectively.

* * * * *

UNITED STATES PATENT AND TRADEMARK OFFICE
CERTIFICATE OF CORRECTION

PATENT NO. : 4,106,261
DATED : August 15, 1978
INVENTOR(S) : E. L. Greenawalt

It is certified that error appears in the above–identified patent and that said Letters Patent are hereby corrected as shown below:

Column 3, line 16, delete the word "silicon" and insert --silicone--.

Column 5, line 59, delete the word "segmment" and insert --segment--.

Column 6, line 10, insert the word --and-- after the word "plies".

Column 6, Claim 1, line 65, insert the word --and-- after the word "seals,".

Column 7, Claim 1, line 8, delete the word "ply" at the beginning of the line.

Signed and Sealed this

Thirteenth Day of May 1980

[SEAL]

Attest:

SIDNEY A. DIAMOND

Attesting Officer

Commissioner of Patents and Trademarks